United States Patent [19]

Malassine et al.

[11] 4,163,740

[45] Aug. 7, 1979

[54] PROCESS FOR THE PREPARATION OF POLYSTYRYLPYRIDINE

[75] Inventors: Bernard P. Malassine, Vert le Petit; Jean-Claude C. Gautier, Ablon sur Seine; Sammy H. Chevalier, Paris; Gérard R. Berteleau, Ris Orangis, all of France

[73] Assignee: Societe Nationale des Poudres et Explosifs, Paris, France

[21] Appl. No.: 870,854

[22] Filed: Jan. 19, 1978

[30] Foreign Application Priority Data

Jan. 25, 1977 [FR] France .............................. 77 01955

[51] Int. Cl.² .............................................. C08G 12/26
[52] U.S. Cl. .......................... 260/31.2 N; 260/32.8 N; 260/33.4 R; 260/33.8 R; 528/248
[58] Field of Search ............ 260/67.5, 32.8 N, 31.2 N, 260/33.4 R, 33.8 R; 528/232, 248

[56] References Cited

U.S. PATENT DOCUMENTS 3,994,862  11/1976  Ropars ................................ 260/67.5

*Primary Examiner*—Paul R. Michl
*Attorney, Agent, or Firm*—Bucknam and Archer

[57] ABSTRACT

Solutions of polystyrylpyridine are prepared by a novel process which consists of carrying out the polycondensation of at least one aromatic dialdehyde, preferably terephthalic dialdehyde, and at least one pyridinic derivative substituted by at least two reactive methyl groups at a temperature between 150° C. and 200° C. The polycondensation reaction is stopped after the extent of condensation is equal to at least 40%, the polycondensate is then dissolved in a solvent which is methylethylketone, ethyl acetate, methylene chloride, trichloroethylene, chlorobenzene, n-propanol and preferably a mixture of methylethylketone and n-propanol.

The polystyrylpyridine solutions obtained according to the process of this invention are useful for the preparation of composite materials which exhibit very good mechanical properties, excellent behavior under conditions of high temperature, flame and chemical and atmospheric agents.

10 Claims, No Drawings

PROCESS FOR THE PREPARATION OF POLYSTYRYLPYRIDINE

The present invention relates to the preparation of thermostable resins and more specifically to thermostable resins which may be directly used for the preparation of composite materials.

It is known that polystyrylpyridine may be used as a thermostable resin. However, in order to utilize this resin as an impregnation resin for the preparation of composite materials, it is necessary that the resin exhibit a certain viscosity which depends upon the method used. If the method involving fritted bronze is used, it is necessary that the resin have viscosity in the range of 500 centipoises at 25° C. If the impregnation technique used is the technique involving a drum, the viscosity of the resin should not exceed 15000 centipoises. A third method, impregnation by immersion, requires that the resin have preferably a viscosity in the range of 200 centipoises.

For any specific resin such a variety of viscosity may be achieved by different methods. Above all it is possible to stop the polymerization reaction after the condensation has proceeded to a moderate extent. A second method involves heating the resin. Still another method involves diluting the resin by means of a suitable solvent.

With respect to the last method, it has been known to dissolve polystyrylpyridine in solvents such as dimethylformamide or N-methylpyrrolidone.

However, these solvents develop an uncomfortable odor and unfortunately exhibit a certain amount of toxicity. In addition they exhibit a small degree of volatility and for this reason it is difficult to eliminate the solvent from the composite materials after impregnation; in this connection it is known that the residual solvent affects unfavorably the mechanical properties of the material, particularly in the case of laminates reinforced with carbon fibers.

Some novel thermostable resins of the polyimide type today are available in solvent mixtures such as N-methylpyrrolidone/ethanol, but the elimination of these solvents, which is essential in order to obtain laminates of low porosity and therefore good mechanical properties, requires complex cycles of heating at a temperature substantially higher than 300° C.

The object of the present invention is to provide a process which permits to obtain polystyrylpyridine in solution in a variety of very volatile solvents which are non-toxic and the odor of which is very tolerable. The solutions of the resins so obtained may be used directly for the preparation of composite materials.

The process according to the present invention consists of carrying out the polycondensation of at least one aromatic dialdehyde, preferably terephthalic aldehyde and at least one pyridinic derivative which is substituted by at least two reactive methyl groups at a temperature between 150° and 200° C., either in the presence or in the absence of an excess of the pyridinic derivative. In the first case, the polycondensation reaction is stopped when the extent of condensation is equal to at least 50% and then the excess of the pyridinic derivative is almost totally removed. In the second case, the fact that there is no excess of the pyridinic derivative means that the number of reactive methyl groups located in position 2 and 6 of the pyridinic nucleus does not exceed the number of aldehyde groups introduced at the beginning of the reaction. The reactive methyl groups which may be present in the 4 position are not taken into consideration except for the purpose of calculating the minimum amount of methyl groups in the 2 and in the 6 position which must be reacted, the total number of reactive groups in the 2, 4, 6 position being at least equal to the number of aldehyde groups. In accordance with the second method the step of eliminating the excess of the pyridinic derivative which has been described hereinabove is eliminated so that the synthesis is simplified the requirement of a minimum of condensation which is necessitated because of the risk of eliminating the aldehyde which has not reacted does not exist. Also the eventual elimination of the reaction catalyst which could be prejudicial to the total cross-linking and to the thermostability of the resin is avoided.

The polycondensate is dissolved at the end of the reaction in a solvent which is methylethylketone, ethyl acetate, methylene chloride, trichloroethylene, chlorobenzene, ethanol and n-propanol. Preferably there is utilized a mixture of methylethylketone and n-propanol with a low content of n-propanol, because this mixture offers a very good balance between solubility, high yield of dry extract, low viscosity and ease of elimination at a low temperature.

Polystyrylpyridine is the product of polycondensation of a pyridinic derivative which is substituted by at least two reactive methyl groups and at least one aromatic dialdehyde, preferably terephthalic aldehyde. The methyl substituents in the pyridinic compound are reactive if they are in position 2, 4, or 6.

The monomer reacts according to the reaction scheme shown hereinbelow:

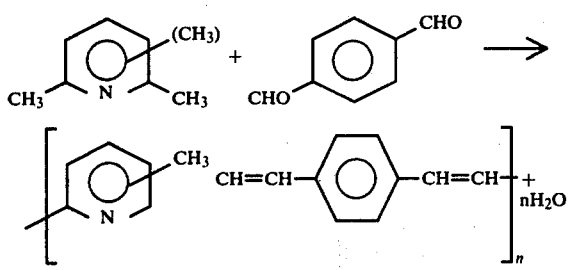

It has been discovered that in reality the intermediate condensation stage proceeds according to such a reaction kinetics that it is possible to obtain in addition to unsaturated compounds also compounds of the type:

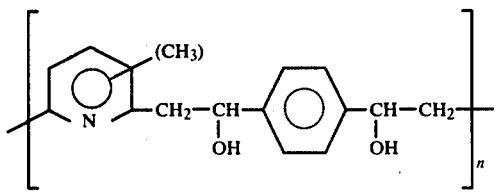

The alcoholic functional group present in the formula hereinabove have been identified by nuclear magnetic resonance spectography. The relative course of the two preparation stages of the reaction, condensation followed by dehydration, may be determined by quantitive analysis based on infrared spectography. The alcohol groups in the polycondensate, the quantity of which depends on the reaction catalyst and on the conditions of operation, are particularly advantageous to the solubilization in the solvents which have been retained.

The extent of condensation, which represents the proportion of carbonyl groups which have reacted with respect to the number of carbonyl functional groups initially present, may be determined by infrared analysis on the basis of the band in the region of 1700 cm$^{-1}$. The extent of unsaturation which represents the course of the dehydration reaction may be determined by measuring the band in the region of 970 cm$^{-1}$ which is typical for double bonds.

The extent of condensation could be equally determined on the basis of the water formed during the course of the reaction. However, it should be noted that there is a difference between the amount of carbonyl functional groups used up and the amount of water formed, the amount of water formed being always lower than the amount of carbonyl functional groups used up. This difference is due to the presence of alcoholic functional groups which are formed in the first stage of the reaction.

As a catalyst one may use a variety of substances and particularly acids, bases or salts. Equally one may utilize chlorides of acids, for instance terephthalic acid chloride, in an amount in the order of 0.1-10% in moles with respect to the aromatic dialdehyde without affecting the properties of the resin and particularly the thermostability.

The solvents listed hereinabove permit to obtain solutions of the resins which are relatively concentrated, the viscosity of which is in the range between 20 centipoises and 19,000 centipoises. The solubility of the polystyrylpyridine resin in these solvents is improved when one adds to these solvents 5-10% of n-propanol. This improvement in solubility has a particular value during impregnation to the extent that the problems of recovery of the solvents are diminished.

The solutions of the polystyrylpyridine obtained according to the process of this invention are utilized for the impregnation of the fibrous materials. The impregnated fibers are subjected to a heating step in the course of which cross-linking bonds are formed in the resin. When the pyridinic derivative used for the preparation of the resin has three reactive methyl substituents, cross-linking occurs very rapidly by reaction of the free aldehyde functions of the prepolymer with the free methyl substituents. When the pyridinic derivative contains only two reactive methyl substituents, thermal cross-linking which involves the double bonds occurs. However, the latter reaction is very slow and it is therefore preferably to replace a portion of the disubstituted derivative with a pyridinic derivative which carries at least three reactive methyl groups.

The introduction of more or less substantial amounts of pyridinic derivatives which are substituted only by two reactive methyl groups with pyridinic derivatives which are substituted by three reactive methyl groups permits to modify the final degree of cross-linking and, therefore, to decrease the instability of the resin without affecting the properties of the composite material and without causing modifications in the fundamental reaction scheme or in the manner of operation.

The products in accordance with the invention may be used in a variety of applications in which their good properties may be utilized, particularly in the form of composite materials reinforced with different types of substances with very good mechanical properties, that is a very good behavior to high temperature, to chemical agents and to moisture and an exceptional resistance to flame with emission of very small amounts of fumes and toxic gases. These latter characteristics make the materials reinforced with glass fibers or carbon fibers or other substances prepared in a similar manner with the solutions according to the invention particularly attractive for applications such as the interior equipment of airplanes.

The following examples are described hereinbelow for the purpose of illustrating the present invention.

EXAMPLE 1

This example illustrates the preparation of a solution of polystyrylpyridine in which the amount of condensation is 63%, in n-propanol.

The reaction is carried out in a thermostatic reactor of 2 liter capacity equipped with a stirrer, a Dean and Stark apparatus provided with a condenser to recover the water of condensation, a thermometer and a distillation column provided with a graduated receiver in order to recover the distillate. Into the reactor which is heated by circulation of oil by means of a thermostatic bath, there are introduced 787 grams of technical collidine and 670.5 grams of terephthalic aldehyde, that is 5 moles. Technical collidine consists of 65% of gamma-collidine (2,4,6-trimethyl pyridine), 24% of 2,3,6-trimethyl pyridine and 11% of 3,5-dimethyl pyridine which is non-reactive. Therefore, the collidine used contains 89% by weight of reactive component, that is 5.78 moles. The excess of the pyridine derivatives which cpntain at least two reactive methyl groups, therefore, is 15.6%.

When the temperature of the reaction medium reaches 100° C., the catalyst, 6.6 cc of $H_2SO_4$ is added very slowly. The temperature is stabilized at 175° C. which corresponds to the reflux point of collidine. During the course of one hour there is collected in the Dean and Stark apparatus 90 cc of water which corresponds to 50% of the water to be collected if the condensation were total. The reaction is then stopped and the reactor is then evacuated in such a manner as to distill rapidly the mixture consisting of the excess of technical collidine. After 220 grams of the distillate is collected in the receiver, the reactor is brought back again to atmospheric pressure. At this point an amount of 1.5% of the initial collidine remains in the polycondensate. The viscosity of the polycondensate is 2400 centipoises at 100° C. and 18300 centipoises at 80° C. The infrared spectrum of the resin so obtained indicates that the extent of condensation is 63%.

By progressive addition of n-propanol into the resin so obtained under agitation and at a temperature of 60° C., there is obtained a solution which contains 64% of resin. The viscosity of this solution is 500 centipoises at 22° C.

The solution so obtained is very suitable for the manufacture of composite materials by the method involving the use of fritted bronze.

The presence of residual collidine is indispensible. If one eliminates the excess of collidine totally, that is 239 grams, the preparation of the solution of the polystyrylpyridine in n-propanol is accompanied by difficulties.

After impregnation of a fabric of glass E of style 181 and heating under pressure of 10 bars for a period of four hours at 200° C. and two hours at 250° C., one obtains a laminate of 27% resin content by weight and a limiting oxygen index of 100, with a toxicity of the gases of pyrolysis measured in terms of the lethal dose of 50 being apparent from 119 to 130. The singed lengths (test FAE 2532) and the density of the fumes (Chamber NBS) are extremely small and are comparable to the results obtained with the best phenolic resins and give a performance superior to the polyimide resins.

After impregnation with unidirectional carbon fibers Toray 300 and the preparation of laminates under the conditions described hereinabove, one obtains laminates which have characteristic properties as follows: Interlaminar resistance to shearing 108 MPa at 20° C. and 97 MPa after 690 hours at 70° C. and 95% relative humidity in the preequilibrated test tubes.

EXAMPLE 2

This example illustrates the difference between the extent of condensation which is determined on the basis of the percentage of carbonyl groups used up and the amount of water formed.

The polycondensation is carried out according to example 1. Three samples of polycondensate are removed respectively after removal of a quantity of water which corresponds to an amount of 20%, 40% and 50% respectively and the samples are examined by infrared analysis. The relation between the amount of water and the amount of the polycondensate appears from the table below:

| RESIN | 1 | 2 | 3 |
|---|---|---|---|
| Amount of water collected | 20% | 40% | 50% |
| Extent of condensation | 51% | 54% | 63% |

EXAMPLE 3

This example illustrates the preparation of a solution of polystyrylpyridine in ethyl acetate. Polystyrylpyridine is prepared according to the procedure described in example 1 with a condensation to the extent of 63%. However, instead of adding n-propanol, after removal of the collidine there is added ethyl acetate. There is obtained in this manner a solution containing 84% of resin which exhibits a viscosity of 10,000 centipoises at room temperature. This solution is suitable for an impregnation technique involving a drum.

EXAMPLE 4

This example illustrates the preparation of solutions of polystyrylpyridine in a mixture of solvents. Polystyrylpyridine with a condensation to the extent of 63% is prepared according to the procedure of example 1. After removal of the collidine, a mixture containing 75% of methylethylketone and 25% of n-propanol is added to the resin. The resin solution in this mixture of solvents remains clear up to an amount of 75% of resin. At this point the viscosity of the solution is 52 centipoises at 22° C.

This solution is of particular interest because with a viscosity essentially equivalent to the viscosity in example 1, the amount of dry extract is superior. When the amount of resin in the solution is 60%, the viscosity of the solution at 20° C. is 20 centipoises. This solution, however, is less stable than the solution containing 75% of resin.

EXAMPLE 5

This example illustrates the preparation of a resin solution in which the extent of condensation is 51%.

The same procedure used in example 1 is used but the reaction is stopped after 36 cc of water have been collected, corresponding to 20% of the theoretical quantity of water which should be collected. The resin so obtained after elimination of the excess of collidine exhibits a viscosity of 350 centipoises at 80° C. The material is diluted with a solvent mixture consisting of 75% of methylethylketone and 25% of n-propanol. When the solution contains 70% of resin its viscosity is 20 centipoises at 20° C.

EXAMPLE 6

Polystyrylpyridine resin is prepared with an extent of condensation of 63% according to the method described in example 1 and the resin is diluted with a solvent mixture consisting of 92.5% of methylene chloride and 7.5% of n-propanol. The viscosity of the solution is 20 centipoises at 20° C. when the resin content is 52%.

EXAMPLE 7

This example illustrates the independence of the mechanical properties of a composite material with respect to the extent of condensation of the resin utilized for the impregnation, that is with respect to the amount of water which is not eliminated from the resin at the time of the impregnation.

Composite materials have been prepared by impregnating carbon fibers with resins 1, 2 and 3 prepared according to example 2 in a 75% solution in a mixture of methylethylketone and n-propanol according to example 4. During the fabrication of the composite material, the impregnated fibers are subjected to a baking step during the course of which the resin is cross-linked and water is formed which is eliminated, the quantity of water being formed being the more important the lower is the extent of condensation of the resin being used. A determination of the resistance to shearing of the composite material obtained from resins 1, 2 and 3 gives the following results:

| RESIN | 1 | 2 | 3 |
|---|---|---|---|
| $C_h$ bars | 9.2 | 9.3 | 9.5 |

The data above demonstrate that the extent of condensation has a negligible effect on the mechanical properties of the composite materials obtained from the resins prepared according to the process of this invention.

EXAMPLE 8

Preparation of polystyrylpyridine resin in the absence of an excess of the pyridinic derivatives.

This example describes the preparation of polystyrylpyridine resin which may be used as an impregnation resin after it is placed in solution. In a thermostatic reactor of two liter capacity equipped with a mechanical stirrer, a Dean and Stark apparatus provided with a condenser and a thermometer there are introduced 617 grams of technical collidine and 670.7 grams of terephthalic dialdehyde. The technical collidine consists of 65% of 2,4,6-trimethyl pyridine 24% of 2,3,6-trimethyl pyridine and 11% of 3,5-dimethyl pyridine. With this composition the total number of methyl groups reactive to the aldehydic function is 1.26, this is as in the resin used in Example 1 after distillation.

The mixture is heated and it becomes homogeneous at about 90° C. At a temperature of 100° C. there is added all at once 6.6 cc of sulfuric acid which acts as the catalyst. There result a rise in the temperature of the reaction medium which brings collidine to reflux. In the course of 50 minutes there is collected in the Dean and Stark apparatus 81 cc of water which corresponds to the reaction having proceeded to the extent of 45%. In fact in view of the fact that there is no excess of the reagent to be eliminated as in Example 1 and there is no risk of eliminating the aldehyde which is not statistically bound, it is possible to stop the reaction after the reaction has proceeded to an extent slightly less than 50%. This results in an advantage because it is possible to improve the solubility of the resin, to decrease the viscosity with the same amount of the dry extract without modifying the conditions and the period of time during which the resin is handled.

After heating is stopped, there is introduced very rapidly 460 cc of a solvent mixture which contains 75% of methylethylketone and 25% of n-propanol by weight. There is obtained a solution which contains 75% of resin, of viscosity 215 centipoises.

What is claimed is:

1. A process for the preparation of a resin solution for use in the preparation of a composite material by impregnation which consists of carrying out the polycondensation of at least an aromatic dialdehyde and at least one pyridinic derivative substituted by at least two reactive methyl groups at a temperature between 150° C. and 200° C. with an excess of the pyridinic derivative, stopping the reaction after the extent of condensation is equal to 50-63%, essentially totally eliminating the excess of the pyridinic derivative and dissolving the polycondensate so obtained in a solvent which is (1) ethyl acetate, (2) methylene chloride, (3) trichloroethylene, (4) chlorobenzene, (5) ethanol, (6) n-propanol or (7) a mixture of n-propanol and a solvent which is a member selected from the group consisting of (a) methylethylketone (b) ethyl acetate (c) methylene chloride (d) trichloroethylene (3) chlorobenzene (f) ethanol.

2. A process for the preparation of a resin solution for use in the preparation of a composite material by impregnation which consists of carrying out the polycondensation of at least one aromatic dialdehyde and at least one pyridinic derivative substituted by at least two reactive methyl groups at a temperature between 150° and 200° C., stopping the polycondensation after the condensation has proceeded to an extent of 45%-63% and dissolving the polycondensate so obtained in at least one solvent which is (1) ethyl acetate, (2) chlorobenzene, (3) ethanol, (4) n-propanol (5) a mixture of n-propanol and a solvent which is a member selected from the group consisting of (a) methyl-ethylketone (b) ethyl acetate (c) methylene chloride (d) trichloroethylene (e) chlorobenzene (f) ethanol and wherein during the condensation stage the number of reactive methyl groups located in positions 2 and 6 of the pyridinic ring does not exceed the number of aldehydic groups which have been reacted and wherein the total number of reactive methyl groups located in position 2, 4 and 6 is at least equal to the number of the aldehydic groups which are introduced into the reaction.

3. The process according to claim 1 wherein the aromatic dialdehyde is terephthalic aldehyde.

4. The process according to claim 2 wherein the aromatic dialdehyde is terephthalic aldehyde.

5. The process according to claim 1 wherein the polycondensation is carried out in the presence of a catalyst which is an acid or an acid chloride.

6. The process according to claim 2 wherein the polycondensation is carried out in the presence of a catalyst which is an acid or an acid chloride.

7. The process according to claim 1 wherein the solvent is a mixture of methylethylketone and n-propanol.

8. The process according to claim 2 wherein the solvent is a mixture of methylethylketone and n-propanol.

9. A resin solution for use in the preparation of a composite material by impregnation which consists of polystyrylpyridine in solution in a solvent which is ethyl acetate, methylene chloride, trichloroethylene, chlorobenzene, ethanol or n-propanol, wherein said resin is prepared by the process of claim 1.

10. A resin solution for use in the preparation of a composite material by impregnation which consists of polystyrylpyridine in solution in a solvent which is ethyl acetate, methylene chloride, trichloroethylene, chlorobenzene, ethanol or n-propanol wherein said resin is prepared by the process of claim 2.

* * * * *